(12) United States Patent
Yamazaki et al.

(10) Patent No.: US 8,729,803 B2
(45) Date of Patent: May 20, 2014

(54) VEHICLE HEAD LAMP LIGHT DISTRIBUTION CONTROLLER

(75) Inventors: Masashi Yamazaki, Shizuoka (JP); Yutaka Nakanishi, Shizuoka (JP); Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 111 days.

(21) Appl. No.: 13/359,664

(22) Filed: Jan. 27, 2012

(65) Prior Publication Data
US 2012/0206043 A1 Aug. 16, 2012

(30) Foreign Application Priority Data
Feb. 14, 2011 (JP) .................................. 2011-028053

(51) Int. Cl.
*B60Q 1/02* (2006.01)

(52) U.S. Cl.
USPC .................................. 315/82; 315/77; 315/83

(58) Field of Classification Search
None
See application file for complete search history.

(56) References Cited

U.S. PATENT DOCUMENTS

| 8,552,648 B2* | 10/2013 | Hayakawa | 315/82 |
| 2003/0137849 A1* | 7/2003 | Alden | 362/466 |
| 2009/0279317 A1* | 11/2009 | Tatara | 362/465 |

FOREIGN PATENT DOCUMENTS

| DE | 102007040042 A1 | 2/2009 |
| DE | 102008060949 A1 | 9/2009 |
| EP | 2116421 A2 | 11/2009 |
| EP | 2266838 A1 | 12/2010 |
| EP | 2281719 A1 | 2/2011 |
| JP | 2010-00957 | 1/2010 |

OTHER PUBLICATIONS

European Patent Office, Search Report in Patent Application No. EP 12 15 5260, dated Oct. 21, 2013.

* cited by examiner

*Primary Examiner* — Anh Tran
(74) *Attorney, Agent, or Firm* — Fish & Richardson P.C.

(57) ABSTRACT

A vehicle head lamp light distribution controller includes an ADB controller configured to: detect a position of a vehicle present ahead of a subject vehicle; determine whether the vehicle ahead of the subject vehicle is a preceding vehicle or an oncoming vehicle; set a threshold vehicle position based on whether the vehicle ahead of the subject vehicle is a preceding vehicle or an oncoming vehicle; compare the threshold vehicle position and the detected vehicle position; and switch light distribution of head lamps of the subject vehicle based on the comparison between the threshold vehicle position and the detected vehicle position.

20 Claims, 7 Drawing Sheets

VEHICLE HEAD LAMP LIGHT DISTRIBUTION CONTROLLER

CROSS REFERENCE TO RELATED APPLICATION(S)

This application claims the benefit of priority of Japanese Patent Application No. 2011-028053 filed on Feb. 14, 2011, the disclosure of which is incorporated herein by reference in its entirety.

TECHNICAL FIELD

The present disclosure relates to a light distribution controller for controlling the light distribution of the head lamps of a vehicle, such as an automobile, more particularly, to a light distribution controller for switching light distribution patterns for a vehicle present ahead of the subject vehicle, such as a preceding vehicle or an oncoming vehicle.

BACKGROUND

As an apparatus for the head lamps of an automobile, a light distribution controller adopting ADB (adaptive driving beam) control is available in which glare to the driver of a preceding vehicle or an oncoming vehicle ahead of the subject vehicle is prevented and the visibility of the driver of the subject vehicle is enhanced. With this ADB control, when light irradiation is performed using high-beam light distribution, a vehicle ahead of the subject vehicle, such as a preceding vehicle or an oncoming vehicle, is detected, and light is shielded in a region where glare may be given to the driver of the detected vehicle ahead. That is, the region ahead of the subject vehicle is irradiated widely as much as possible while glare to the driver of the vehicle ahead is prevented and the visibility of the driver of the subject vehicle is improved. For example, according to Japanese Patent Document JP-A-2010-000957, a vehicle present ahead of the subject vehicle is detected, light distribution having additional light distribution in a region above a cut-off line of the low-beam light distribution pattern of the head lamps of the subject vehicle is formed, and this light distribution pattern is swivel-controlled in the left-right direction in response to the position of the vehicle ahead, whereby the visibility of the driver of the subject vehicle in the region ahead of the subject vehicle is improved without causing glare to the driver of the vehicle ahead.

With the ADB control described above, light distribution is switched primarily on the basis of the position of a vehicle ahead regardless of the type of the vehicle, that is, regardless of whether the vehicle is a preceding vehicle or an oncoming vehicle. As a result, when the position of the vehicle ahead changes frequently, the light distribution is switched frequently. This switching of the light distribution can disturb the driver of the subject vehicle. For example, when the ADB control for switching a light distribution pattern to a high-beam light distribution pattern having a different cut-off line shape is performed with an oncoming vehicle (in which the oncoming vehicle and the subject vehicle are supposed to pass each other), the oncoming vehicle moves from a region far ahead of the subject vehicle to a region closer to the subject vehicle. The light distribution pattern then is switched to a high-beam light distribution pattern, the cut-off line of which is displaced gradually rightward as the oncoming vehicle comes closer to the subject vehicle on a left-hand traffic road. For this reason, it is assumed that the pattern is switched to a light distribution pattern having a different cut-off line each time the subject vehicle and an oncoming vehicle pass each other. Accordingly, when the subject vehicle and multiple oncoming vehicles pass each other continuously, the light distribution pattern is switched repeatedly and frequently. This frequent switching of the light distribution pattern can disturb the driver of the subject vehicle.

Furthermore, ADB control has been proposed, where the ADB control is capable of performing the so-called swivel control, in which a light distribution pattern is moved in the left-right direction in response to the change in the position of a vehicle ahead. However, in this kind of ADB control, the driver of the subject vehicle can experience significant trouble when the subject vehicle and multiple oncoming vehicles pass each other. More specifically, when the subject vehicle and the leading oncoming vehicle pass each other and when the cut-off line of the light distribution pattern is moved rightward in response to the movement of the oncoming vehicle, the subsequent oncoming vehicle present far ahead is detected at a position close to the center of the pattern. Hence, the light distribution pattern is moved leftward instantaneously to respond to the position of the subsequent oncoming vehicle. In other words, the cut-off line of the light distribution pattern is controlled so as to move left to right and then right to left each time the subject vehicle and each oncoming vehicle pass each other. As a result, the light distribution pattern is moved frequently when the subject vehicle and multiple oncoming vehicles pass each other. This switching of the light distribution pattern can disturb the driver of the subject vehicle.

SUMMARY

The subject matter of the present disclosure is directed towards, among other things, a light distribution controller capable of relieving distractions to a driver of a subject vehicle caused by the switching of light distribution in the ADB control.

In general, one aspect of the subject matter described in the present disclosure can be embodied in a light distribution controller that includes an ADB controller to: detect a position of a vehicle present ahead of a subject vehicle; determine whether the vehicle ahead of the subject vehicle is a preceding vehicle or an oncoming vehicle; set a threshold vehicle position based on whether the vehicle ahead of the subject vehicle is a preceding vehicle or an oncoming vehicle; compare the threshold vehicle position and the detected vehicle position; and switch light distribution of head lamps of the subject vehicle based on the comparison between the threshold vehicle position and the detected vehicle position.

In some implementations, the ADB controller is further configured to adjust a light distribution switching margin based on whether the vehicle ahead of the subject vehicle is a preceding vehicle or an oncoming vehicle. The ADB controller is further configured to: set the light distribution switching margin to a first value when the vehicle ahead of the subject vehicle is an oncoming vehicle; and set the light distribution switching margin to a second value when the vehicle ahead of the subject vehicle is a preceding vehicle, wherein the first value is larger than the second value.

When a light distribution pattern is controlled so as to change depending on the position of a vehicle present ahead of the subject vehicle, the timing of switching the light distribution pattern can be made different depending on whether the vehicle ahead is a preceding vehicle or an oncoming vehicle. Hence, when a preceding vehicle is highly likely to be present at an almost constant position ahead of the subject vehicle, the light distribution pattern can be switched and held to a light distribution pattern having high visibility, in which the switching of the light distribution pattern is suppressed and a distraction to the driver of the subject vehicle can be prevented. Moreover, in the case of an oncoming vehicle, in which the position of the oncoming vehicle changes frequently, the light distribution pattern can be switched to a light distribution pattern having an excellent glare preventive property, whereby the switching of the light distribution pattern is suppressed regardless of the frequent change in the vehicle position such that a distraction to the driver of the subject vehicle can be prevented.

Still further, since the capability of the switching of the light distribution in response to the change in the vehicle position in the case of a preceding vehicle is made higher than that in the case of an oncoming vehicle, quick switching of the light distribution can be accomplished while glare to the driver of the vehicle can be prevented. On the other hand, light distribution can be prevented from being switched frequently, such that a distract troublesomeness to the driver of the subject vehicle is prevented. The capability can be adjusted depending on the size of the margin that is set for the vehicle position. Other aspects, features and advantages will be apparent from the following detailed description, the accompanying drawings and the claims.

BRIEF DESCRIPTION OF THE DRAWINGS

The drawings and the associated descriptions are provided to illustrate examples and do not limit the scope of the invention.

DETAILED DESCRIPTION

Figure 1:
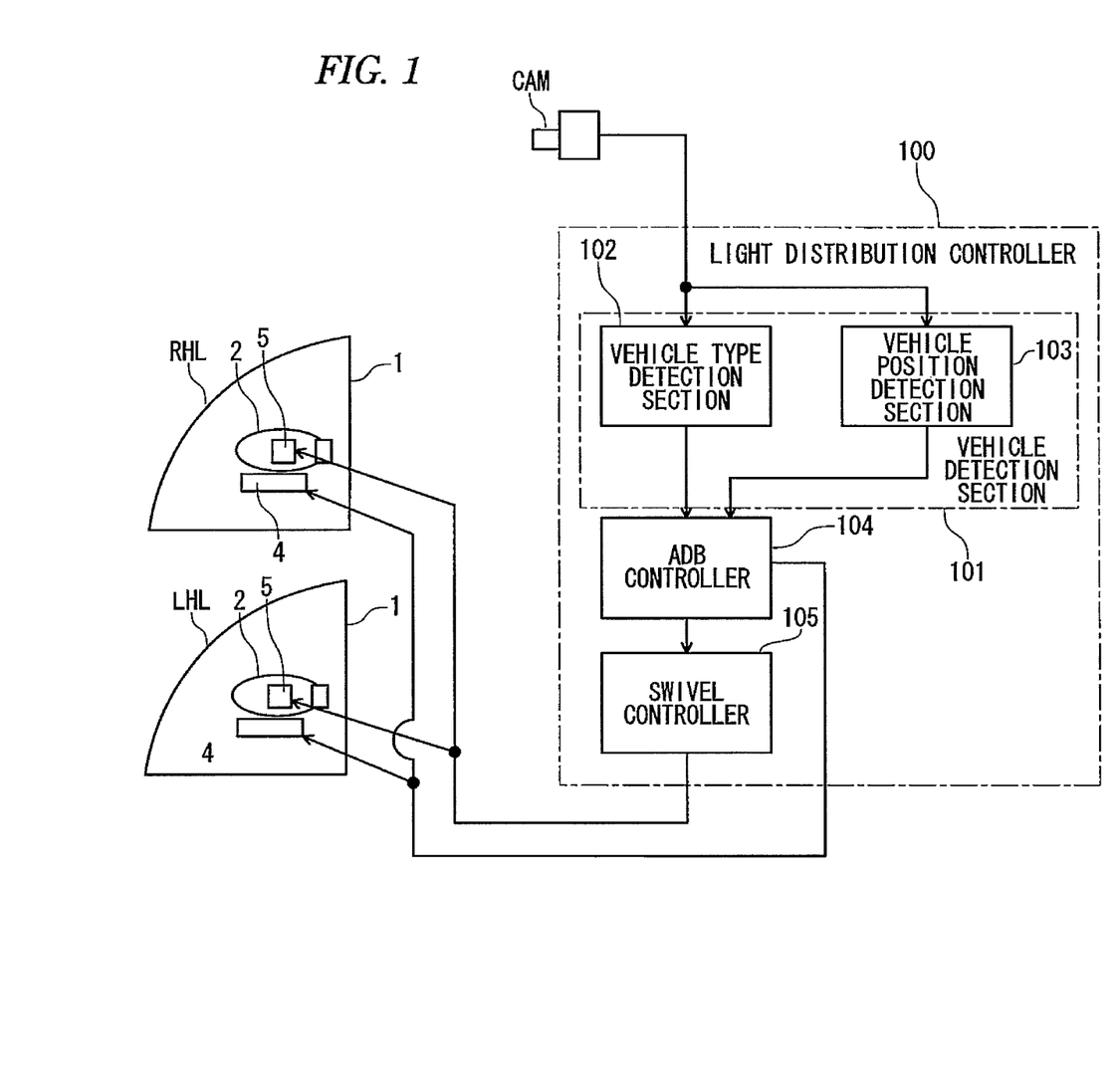
FIG. 1 is a schematic diagram of a conceptual configuration of an example of a light distribution controller.
Figure 2:
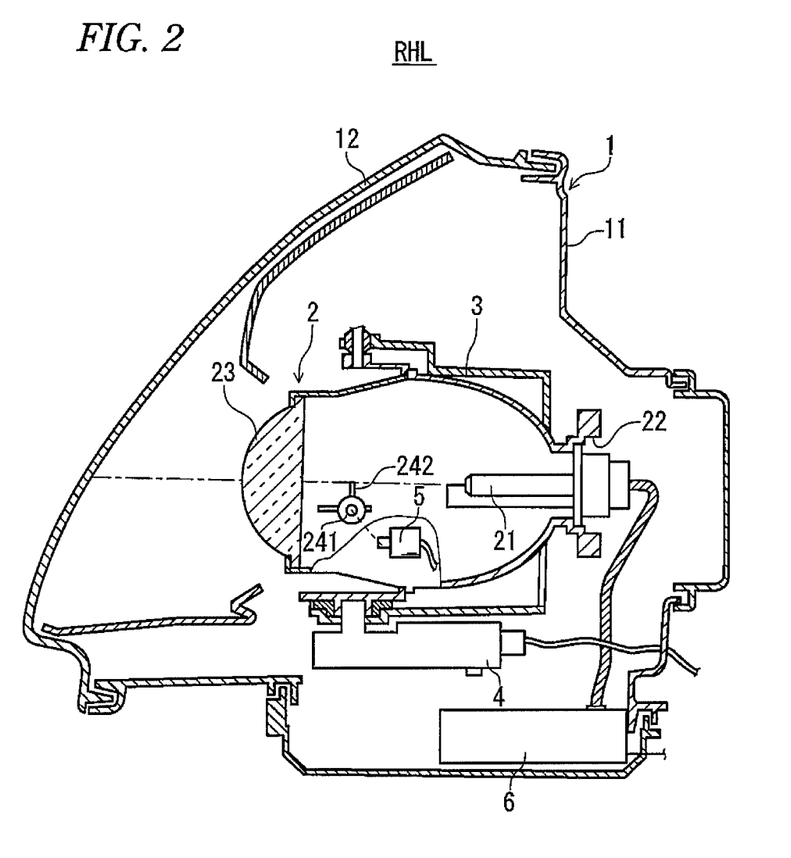
FIG. 2 is a schematic diagram of an example of a configuration of a head lamp.

FIG. 1 is a schematic diagram showing a conceptual configuration of a light distribution controller for use with head lamps of an automobile. A left head lamp LHL and a right head lamp RHL are mounted on the left and right of the front section of the automobile, respectively. The embodiment is configured so that the light distribution of these head lamps LHL and RHL is controlled using a light distribution controller 100. The left and right head lamps LHL and RHL basically have the same configuration. For example, in the right head lamp RHL shown in FIG. 2, a projector-type lamp unit 2 is incorporated inside a lamp housing 1 formed of a lamp body 11 and a translucent front cover 12. This lamp unit 2, although not detailed herein, is equipped with a light source 21 formed of a discharge bulb, a reflector 22 having a spheroidal shape, a projection lens 23 disposed ahead of the reflector 22, and a variable shade 24 for forming the light distribution pattern of the light projected from the projection lens 23. The lamp unit 2 is configured so as to be supported using a bracket 3 disposed inside the lamp housing 1 and so as to be subjected to swivel control in the left-right direction using a swivel actuator 4, in other words, so that the direction of light irradiation is deflectable in the left-right direction. Furthermore, the variable shade 24 is configured so as to be equipped with multiple light-shielding plates 242 having different shapes on the peripheral face of a main shaft 241 having a cylindrical shape. The rotation position of the variable shade 24 is variable around the axial direction thereof using a shade actuator 5. The light-shielding plate 242 positioned on the optical axis of the lamp is changed by changing the rotation position, in which the light distribution pattern of the light projected from the lamp unit 2 can be changed. The discharge bulb 21 is electrically connected to a discharge circuit unit 6 and is lit.

Figure 3:
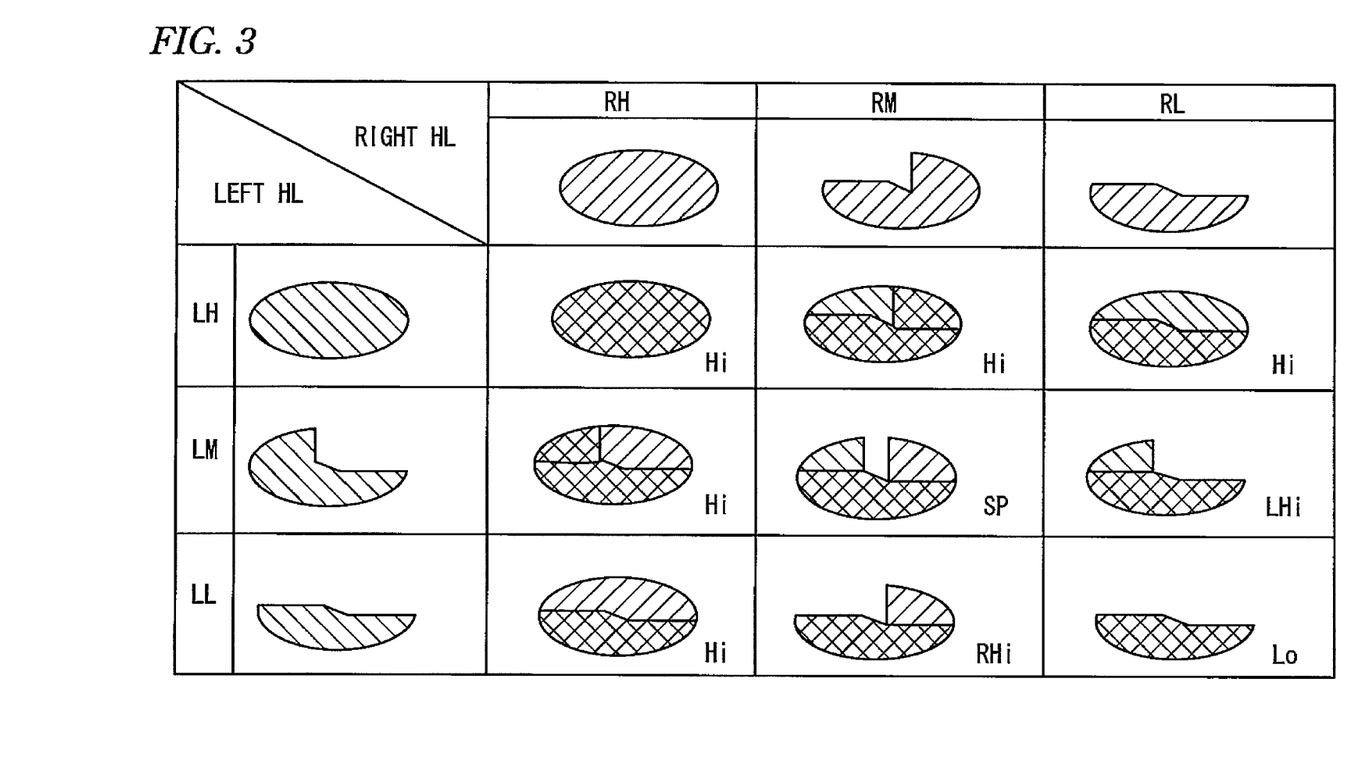
FIG. 3 is a chart illustrating the setting of the light distribution patterns of left and right head lamps.

FIG. 3 is a schematic diagram showing the light distribution patterns of the left and right head lamps LHL and RHL controlled using the variable shade 24 and also showing the light distribution patterns of the entire head lamp system obtained by superimposing the light distribution patterns of the left and right head lamps LHL and RHL. The right head lamp RHL shown in the horizontal frame of the figure forms a high-beam light distribution pattern RH having no cut-off line at the first rotation position of the variable shade 24 and forms a low-beam light distribution pattern RL having a cut-off line at the third rotation position thereof. Furthermore, the right head lamp RHL forms a right high-beam light distribution pattern having a high-beam light distribution pattern in the right region and a low-beam light distribution pattern in the left region, that is, a light distribution pattern RM, herein simply referred to as a right high-beam light distribution pattern, at the second rotation position thereof. Similarly, the left head lamp LHL shown in the vertical frame of the figure forms a high-beam light distribution pattern LH, a low-beam light distribution pattern LL and a left high-beam light distribution pattern LM depending on the rotation position of the variable shade 24. Hence, the entire head lamp system, the light distribution patterns of the left and right head lamps LHL and RHL are superimposed, whereby lighting is performed using a high-beam light distribution pattern Hi, a low-beam light distribution pattern Lo, a right high-beam light distribution pattern RHi, a left high-beam light distribution pattern LHi, and a split light distribution pattern SP obtained by superimposing the right high-beam light distribution pattern and the left high-beam light distribution pattern and having a concave shape at its central portion, as shown in the figure. As the high-beam light distribution pattern Hi, high-beam light distribution patterns being different in luminosity distribution are obtained by the superimposition of the various light distribution patterns of the left and right head lamps.

Referring to FIG. 1 again, the light distribution controller 100 is equipped with a vehicle detection section 101 for detecting a vehicle ahead of the subject vehicle. This vehicle detection section 101 is equipped with a vehicle type detection section 102 for detecting whether the detected vehicle is a preceding vehicle or an oncoming vehicle and is also equipped with a vehicle position detection section 103 for detecting the position of the detected vehicle. Furthermore, the light distribution controller 100 is equipped with an ADB controller 104 that determines the light distribution patterns of the left and right head lamps LHL and RHL of the subject vehicle on the basis of the detected vehicle type and the detected vehicle position, controls the shade actuators 5 on the basis of the determined patterns and then controls the light distribution of the lamp units 2. Moreover, the light distribution controller 100 is equipped with a Swivel controller 105 for driving the swivel actuators 4 and for swivel-controlling the lamp units 2 in the right-left direction under the control of the ADB controller 104.

An imaging camera CAM for imaging the region ahead of the subject vehicle is connected to the vehicle detection section 101. The vehicle detection section 101 analyzes the image captured by this imaging camera CAM and detects a vehicle present ahead of the subject vehicle. In the vehicle detection section 101, the vehicle type detection section 102 detects whether the detected vehicle is a preceding vehicle or an oncoming vehicle. For example, upon detecting a vehicle from the captured image, the vehicle type detection section 102 judges whether the color of the lamps of the vehicle is a red-based color or a white-based color. In the case that the color is a red-based color, the vehicle type detection section 102 judges that the lamps of the vehicle are tail lamps, thereby detecting that the vehicle is a preceding vehicle. In the case that the color is a white-based color, the vehicle type detection section 102 judges that the lamps of the vehicle are head lamps, thereby detecting that the vehicle is an oncoming vehicle. Alternatively, it is possible to detect a preceding vehicle or an oncoming vehicle on the basis of the movement locus of the vehicle ahead of the subject vehicle on an image screen.

Figure 4A:
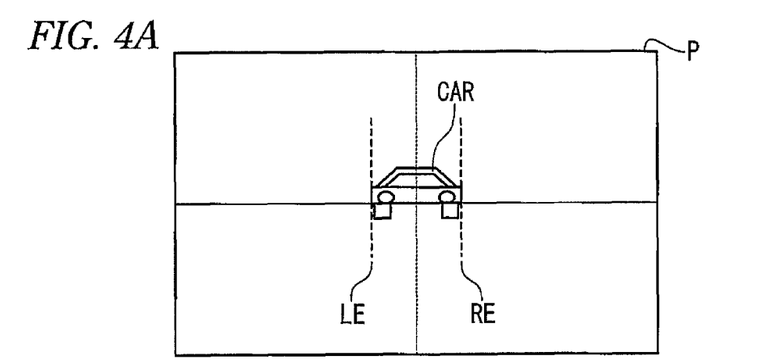
FIGS. 4A to 4C are schematic diagrams, each showing a detection of the position of a vehicle.

The vehicle position detection section 103 detects the position of the detected vehicle. Various methods can be conceived as a method for detecting the vehicle position. For example, it is possible to adopt a method for detecting the lamp position of a vehicle as the position of the vehicle. As shown in FIG. 4A, the vehicle position detection section 103 herein detects, as the vehicle position of a vehicle CAR ahead of the subject vehicle, the position being present in a captured image P, whether both the left and right end positions of the vehicle, that is, the right end RE and the left end LE as viewed from the subject vehicle, are located at the left or right position in the straight-ahead direction of the subject vehicle. The respective pieces of information regarding the vehicle type and the vehicle position detected as described above are input to the ADB controller 104.

The ADB controller 104 independently controls the shade actuators 5 of the variable shades 24 of the left and right head lamps LHL and RHL, whereby the light distribution pattern of the right head lamp RHL can be switched to the light distribution pattern RH, RL or RH and the light distribution pattern of the left head lamp LHL can be switched to the light distribution pattern LH, LL or LM as shown in FIG. 3. Hence, by the superimposition of the light distribution patterns of the left and right head lamps LHL and RHL, the light distribution pattern of the entire head lamp system can be controlled to any one of the high-beam light distribution pattern Hi, the low-beam light distribution pattern Lo, the right high-beam light distribution pattern RHi, the left high-beam light distribution pattern LHi and the split light distribution pattern SP. Furthermore, the ADS controller 104 selects one of the light distribution patterns shown in FIG. 3 on the basis of the respective pieces of information regarding the vehicle type and the vehicle position having been input thereto.

The Swivel controller 105 drives the swivel actuators 4 of the left and right headlamps LHL and RHL by following the vehicle position of the detected vehicle ahead of the subject vehicle and swivel-controls the respective lamp units 2 of the head lamps LHL and RHL independently in the left-right direction. The Swivel controller 105 herein performs swivel control in the left-right direction so that the center position of each light distribution pattern, that is, the position of each optical axis, has a predetermined positional relationship with the vehicle ahead of the subject vehicle under the control of the ADB controller 104. In particular, at the time of the swivel control, the position of the optical axis can be controlled so that the vertical cut-off line in each of the right high-beam light distribution pattern RM and the left high-beam light distribution pattern LM does not overlap with the vehicle ahead of the subject vehicle and doe not cause glare to the driver of the vehicle ahead of the subject vehicle.

Figure 5:
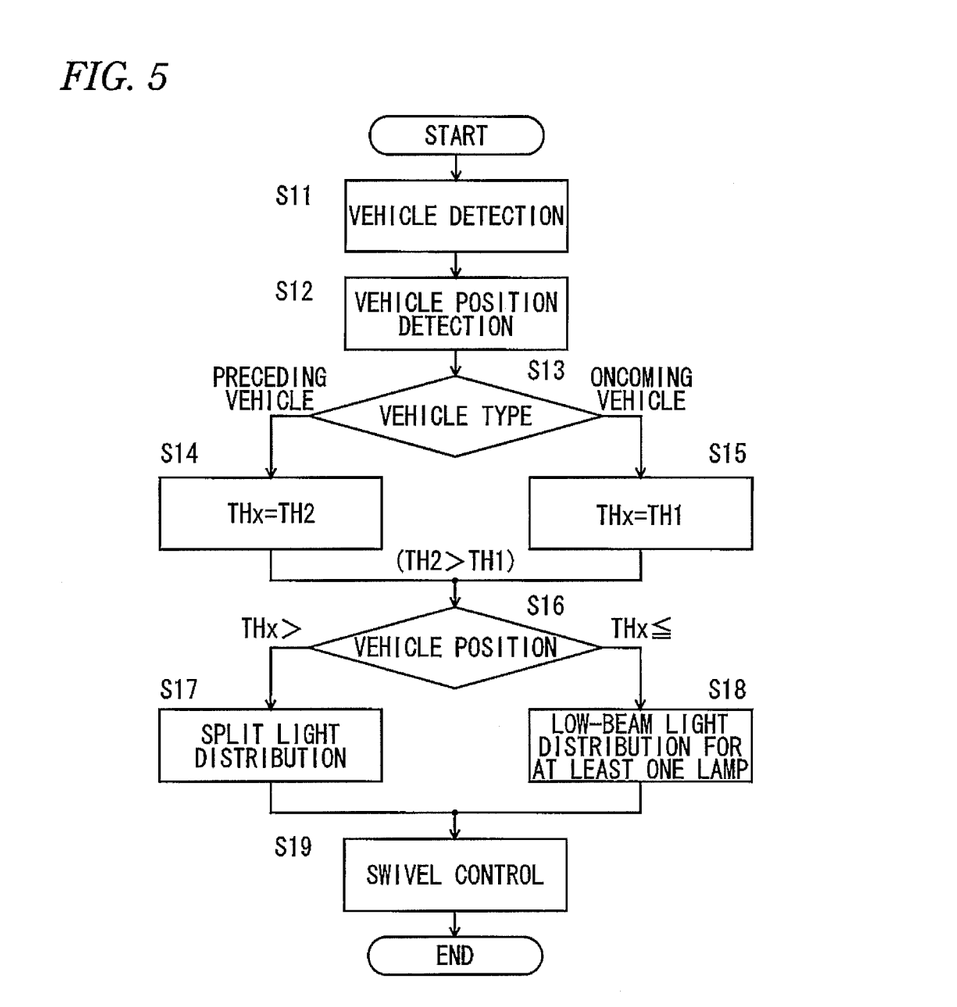
FIG. 5 is a flowchart illustrating light distribution control.

Next, the operation of the light distribution controller 100 according to the embodiment configured as described above will be described below. FIG. 5 is a flowchart for explaining the flow of the light distribution control. The vehicle detection section 101 receives an image signal representing the region ahead of the subject vehicle and captured using the imaging camera CAM and detects a vehicle ahead of the subject vehicle using this image signal (S11). Upon detecting the vehicle ahead of the subject vehicle, the vehicle type detection section detects whether the vehicle type of the detected vehicle ahead is a preceding vehicle or an oncoming vehicle (at S11). At the same time, the vehicle position detection section 103 detects the position of the vehicle ahead of the subject vehicle (at S12). The vehicle position herein corresponds to the left end position and the right end position of the vehicle as described above.

The vehicle type detected using the vehicle type detection section 102, that is, the information regarding whether the vehicle ahead is a preceding vehicle or an oncoming vehicle, is input to the ADB controller 104. In the case that the vehicle ahead of the subject vehicle is a preceding vehicle (S13: PRECEDING VEHICLE), the ADB controller 104 sets x as a threshold value THx for judging the vehicle position to x=2 (at S14). In the case that the vehicle ahead of the subject vehicle is an oncoming vehicle (S13: ONCOMING VEHICLE), the ADB controller 104 sets x as the threshold value THx to x=1 (at S15). It is herein assumed that TH2>TH1. In this condition, the detected vehicle position is compared with the threshold value THx. When the vehicle position is smaller than the threshold value THx, the light distribution patterns of the left and right head lamps LHL and RHL are each set to a one-side high-beam light distribution pattern. In other words, the light distribution pattern of the right head lamp RHL is set to the right high-beam light distribution pattern RM, and the light distribution pattern of the left head lamp LHL is set to the left high-beam light distribution pattern LM. Hence, control is performed to obtain the split light distribution pattern SP that is formed by superimposing the light distribution patterns of the left and right head lamps LHL and RHL (at S17). Furthermore, when the detected vehicle position is equal to or more than the threshold value THx, at least one of the light distribution patterns of the left and right head lamps LHL and RHL is set to a low-beam light distribution pattern. For example, the light distribution pattern of the right head lamp RHL is set to the right high-beam light distribution pattern RM, and the light distribution pattern of the left head lamp LHL is set to the low-beam light distribution pattern LL. Alternatively, the light distribution patterns of the two head lamps are each set to a low-beam light distribution pattern (at S18). As a result, the light distribution pattern of the entire head lamp system becomes a one-side high-beam light distribution pattern or a low-beam light distribution pattern. At the same time, the vehicle position detected using the vehicle position detection section 103 is input from the ADS controller 104 to the Swivel controller 105. The Swivel controller 105 controls the swivel actuators 4 of the left and right head lamps LHL and RHL on the basis of the vehicle position and performs swivel control with respect to the optical axes of the left and right head lamps LHL and RHL, that is, the centers of the light distribution patterns thereof (at S19).

Figure 6A:
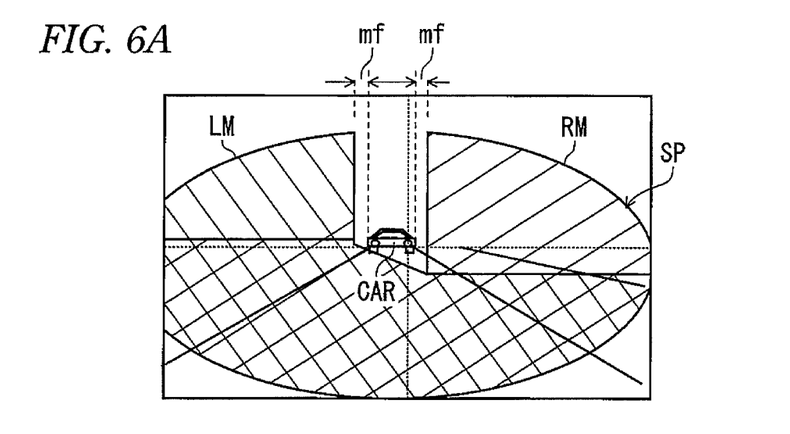
FIGS. 6A to 6C are schematic diagrams, each showing an example of light distribution control for a preceding vehicle.

For example, when a preceding vehicle CAR is present far ahead of the subject vehicle as shown in FIG. 6A and in the case that the preceding vehicle CAR is detected in a region close to the straight-ahead direction of the subject vehicle, the detected vehicle position is compared with the threshold value TH2. Since the threshold value TH2 is a large value, the vehicle position is judged to be smaller than the threshold value TH2. The ADB controller 104 sets the light distribution patterns of the left and right head lamps LHL and RHL to the left high-beam light distribution pattern LM and the right high-beam light distribution pattern RM, respectively, whereby the split light distribution pattern SP is obtained as the light distribution pattern of the entire head lamp system. At the same time, the Swivel controller 105 performs swivel control so that the optical axes of the split light distribution pattern are opposed to the preceding vehicle CAR. As a result, the preceding vehicle CAR is positioned at the split section of the split light distribution pattern SP, that is, a light-shielding section securely obtained in the central region of the high-beam light distribution pattern Hi. Hence, glare to the driver of the preceding vehicle CAR is prevented, and the visibility of the driver of the subject vehicle is securely obtained by the lighting around the preceding vehicle CAR.

Figure 6B:
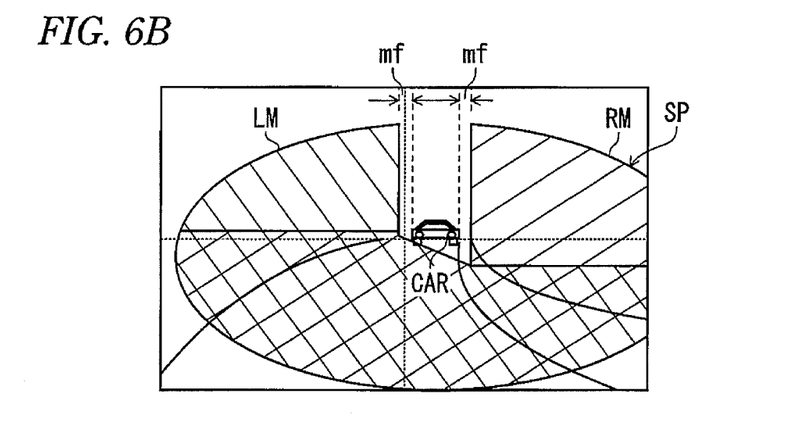

On a gently right-curved road, the preceding vehicle CAR is detected on the slightly right side of the straight-ahead direction of the subject vehicle as shown in FIG. 6B. Even in this case, the vehicle position is smaller than the threshold value TH2, and the ADB controller 104 holds the light distribution patterns of the left and right head lamps LHL and RHL at the left high-beam light distribution pattern LM and the right high-beam light distribution pattern RM, respectively, whereby the split light distribution pattern SP is obtained as the light distribution pattern of the entire head lamp system. At the same time, the Swivel controller 105 swivel-controls the optic axes of the left and right head lamps LHL and RHL slightly rightward by following the detected vehicle position. The preceding vehicle CAR is positioned at the light-shielding section of the split light distribution pattern SP by the swivel control of the split light distribution pattern SP. Hence, glare to the driver of the preceding vehicle is prevented, and the visibility of the driver of the subject vehicle is securely obtained by the lighting around the preceding vehicle CAR.

Figure 6C:
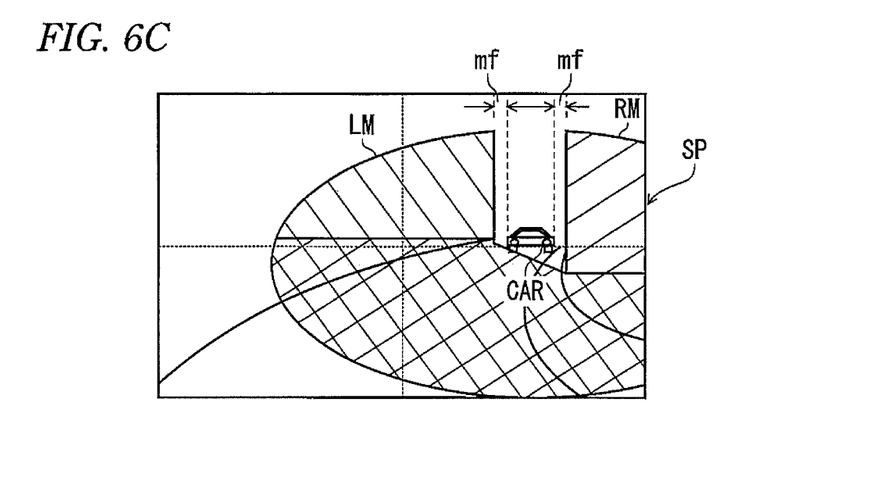

On a sharply right-curved road, the preceding vehicle CAR is detected on the right side of the subject vehicle as shown in FIG. 6C. Even in this case, the vehicle position is not larger than the threshold value TH2, and the ADB controller 104 holds the light distribution patterns of the left and right head lamps LHL and RHL at the left high-beam light distribution pattern LM and the right high-beam light distribution pattern RM, respectively, whereby the split light distribution pattern SP is held as the light distribution pattern of the entire head lamp system. At the same time, the Swivel controller 105 swivel-controls the optical axes of the left and right head lamps LHL and RHL further rightward. The preceding vehicle CAR is still positioned at the light-shielding section of the split light distribution pattern SP by the swivel control of the split light distribution pattern SP. Hence, glare to the driver of the preceding vehicle is prevented, and the visibility of the driver of the subject vehicle is securely obtained by the lighting around the preceding vehicle CAR.

Figure 7A:
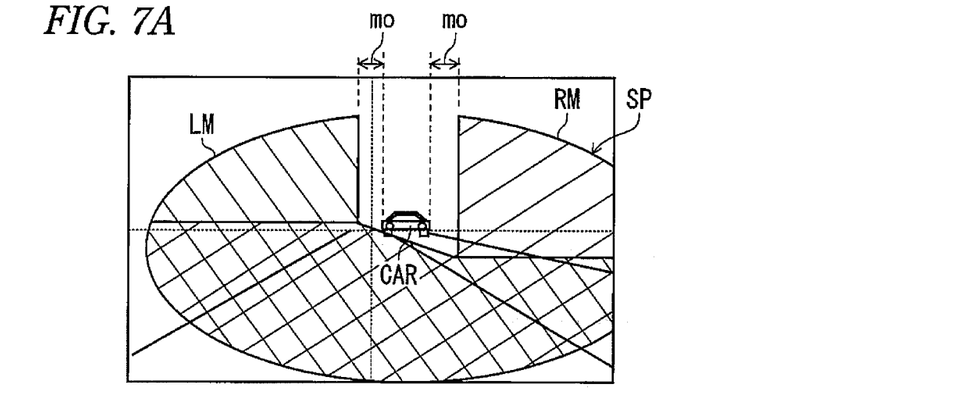
FIGS. 7A to 7C are schematic diagrams, each showing an example of light distribution control for an oncoming vehicle.

On the other hand, when an oncoming vehicle CAR is present far ahead of the subject vehicle as shown in FIG. 7A, the oncoming vehicle CAR is detected in a region close to the straight-ahead direction of the subject vehicle. The detected vehicle position is compared with the threshold value TH1 that is smaller than the threshold value TH2. Since the vehicle position is smaller than the threshold value TH1, the ADB controller 104 sets the light distribution patterns of the left and right head lamps LHL and RHL to the left high-beam light distribution pattern LM and the right high-beam light distribution pattern RM, respectively, whereby the split light distribution pattern SP is obtained as the light distribution pattern of the entire head lamp system. As a result, as in the case of the preceding vehicle, the oncoming vehicle car is positioned at the split section of the split light distribution pattern SP, that is, at a light-shielding section securely obtained at the center of the high-beam light distribution pattern Hi. Hence, glare to the driver of the oncoming vehicle CAR is prevented, and the visibility of the driver of the subject vehicle is securely obtained by the lighting around the oncoming vehicle CAR.

Figure 7B:
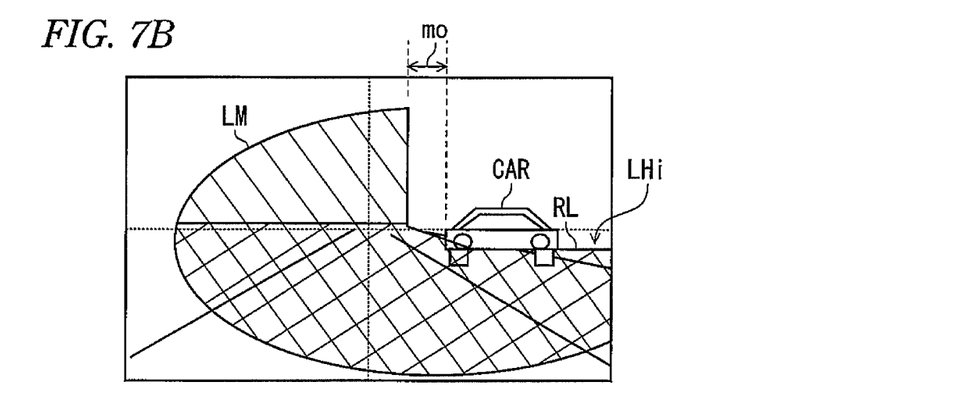

When the oncoming vehicle CAR comes close as shown in FIG. 7B, the oncoming vehicle CAR is detected on the right side of the straight-ahead direction of the subject vehicle, and the vehicle position immediately becomes equal to or more than the threshold value TH1, the smaller threshold value. The ADB controller 104 switches the light distribution pattern of the right head lamp RHL to the low-beam light distribution pattern RL on the basis of the vehicle position. The light distribution pattern of the left head lamp LHL remains the left high-beam light distribution pattern LM. As a result, the left high-beam light distribution pattern LHi is obtained as the light distribution pattern of the entire head lamp system. At the same time, the Swivel controller 105 swivel-controls the optical axes of the left and right head lamps LHL and RHL slightly rightward. By virtue of the left high-beam light distribution pattern LHi, glare to the driver of the oncoming vehicle CAR is prevented, and on the other hand, the visibility of the driver of the subject vehicle is securely obtained by the lighting of the high beam light distribution pattern to the left region of the subject vehicle. At the time of the switching of the light distribution pattern of the right head lamp RHL, a configuration should be adopted in which when the light distribution pattern of the right head lamp RHL is switched, a threshold value for the vehicle position is set beforehand and the switching is performed when the vehicle position becomes more than the threshold value rightward.

Figure 7C:
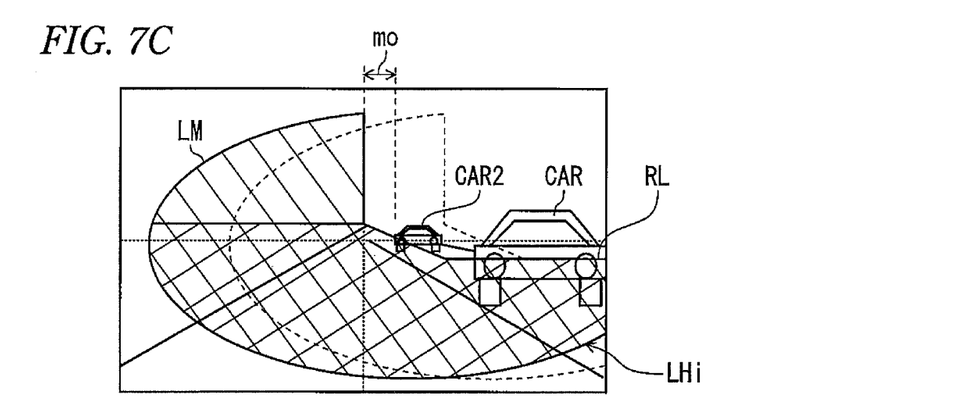

When the oncoming vehicle CAR comes closer as shown in FIG. 7C, the vehicle position is equal to or more than the threshold value TH1, the ADB controller 104 holds the low-beam light distribution pattern RL of the right head lamp RHL and the left high-beam light distribution pattern of the left head lamp LHL. At the same time, the Swivel controller 105 swivel-controls the optical axes of the left and right head lamps LHL and RHL by following the oncoming vehicle as indicated by a broken line in the figure. As a result, the left high-beam light distribution pattern LHi is held as the light distribution pattern of the entire head lamp system. Hence, by virtue of the left high-beam light distribution pattern LHi, glare to the driver of the oncoming vehicle CAR is prevented, and the visibility of the driver of the subject vehicle is securely obtained by the lighting of the high-beam light distribution pattern to the left region of the subject vehicle.

As described above, in the case that the vehicle detected ahead of the subject vehicle is a preceding vehicle, since the threshold value THx of the vehicle position is set to a large value, even if the detected vehicle position is changed slightly in the left-right direction, the vehicle position hardly becomes equal to or more than the threshold value THx, whereby the light distribution controller 100 performs swivel control without light distribution switching, that is to say, while a predetermined light distribution pattern is held, or more specifically, while the split light distribution pattern is held. As a result, the visibility of the driver of the subject vehicle is improved by securely obtaining the lighting in the left and right regions of the preceding vehicle without causing glare to the driver of the preceding vehicle. At the same time, distractions to the driver of the subject vehicle due to the frequent change of the light distribution patterns can be relieved.

On the other hand, in the case that the vehicle detected ahead of the subject vehicle is an oncoming vehicle, the threshold value THx of the vehicle position is set to a small value. In the case that the detected vehicle position is changed slightly in the left-right direction, the vehicle position becomes equal to or more than the threshold value THx, and light distribution switching is performed. In this case, when the vehicle position of the oncoming vehicle is close to the straight-ahead direction of the subject vehicle, the split light distribution pattern is used. However, when the vehicle position is moved slightly rightward and becomes equal to or more than the threshold value THx, the light distribution pattern of the right head lamp RHL is switched to the low-beam light distribution pattern RL, whereby the light distribution pattern of the entire head lamp system is switched from the split light distribution pattern SP to the left high-beam light distribution pattern LHi. The left high-beam light distribution pattern LHi is held hereafter. For this reason, the left high-beam light distribution pattern LHi is held continuously while the subject vehicle and an oncoming vehicle pass each other, in particular, even in the case that the subject vehicle and multiple oncoming vehicles pass each other. As a result, light distribution is not switched frequently, and distractions to the driver of the subject vehicle can be prevented.

Furthermore, even in the case that a vehicle ahead of the subject vehicle is a preceding vehicle, when the vehicle position of the preceding vehicle is close to the subject vehicle or when the subject vehicle passes the preceding vehicle, the vehicle position of the preceding vehicle changes significantly, and the vehicle position becomes more than the threshold value TH2. In such a case, the light distribution pattern of the entire head lamp system of the subject vehicle is switched to a one-side high-beam light distribution pattern or a low-beam light distribution pattern. However, during ordinary driving of an automobile, the above-mentioned state does not occur frequently, and distractions to the driver of the subject vehicle can be prevented.

Figure 4B:
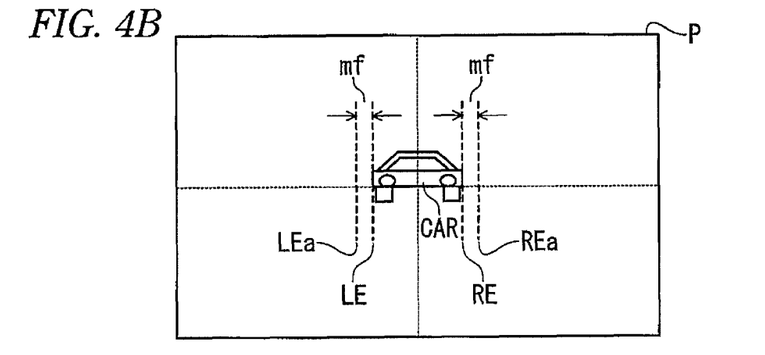
Figure 4C:
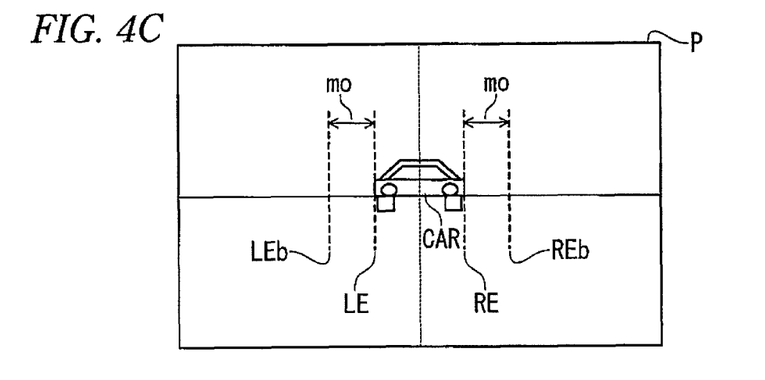

Furthermore, in the light distribution controller 100 according to the present invention, the Swivel controller 105 performs swivel control by following the position of the vehicle ahead of the subject vehicle, regardless whether the vehicle ahead of the subject vehicle is an oncoming vehicle or a preceding vehicle. When the swivel control is performed, a margin is set, and the value of the margin in the case of a preceding vehicle is made different from that in the case of an oncoming vehicle. The margin is set on each of the left side of the left end position LE of the detected vehicle CAR and the right side of the right end position RE thereof as shown in FIG. 4A. In the case of a preceding vehicle, left and right margins mf are set to a predetermined value as shown in FIG. 4B, and the left and right detection positions of the vehicle are corrected by the margin mf to LEa and REa, respectively. Moreover, in the case of an oncoming vehicle, left and right margins mo are set to a value larger than the margin mf for the preceding vehicle as shown in FIG. 4C, and the left and right detection positions of the vehicle are corrected by the margin mo to LEb and REb, respectively.

In addition, the Swivel controller 105 performs swivel control for the left and right head lamps LHL and RHL on the basis of the preset margin mf or mo. More specifically, when the light distribution patterns of the left and right head lamps LHL and RHL are swivel-controlled as described above, the correction positions LEa and LEb or REa and REb obtained by displacing the left end position LE and the right end position RE of the detected vehicle position to the left and the right by the margin are used as vehicle positions. Hence, in the case of a preceding vehicle, when the split light distribution pattern SP is swivel-controlled by following the movement of the preceding vehicle in the left-right direction so that the vertical cut-off lines of the left high-beam light distribution pattern LM of the left head lamp LHL and the right high-beam light distribution pattern RM of the right head lamp RHL hold the margin mf (having been set for the preceding vehicle CAR as shown in FIGS. 6A to 6C), the light distribution of the split light distribution pattern SP is controlled so as to sensitively respond to the change in the movement of the preceding vehicle CAR. Accordingly, highly sensitive light distribution control that responds to the movement of the preceding vehicle can be attained. As a result, light distribution is changed quickly in response to the change in the position of the preceding vehicle such that the visibility of the driver of the subject vehicle can be securely obtained without causing glare to the driver of the preceding vehicle. Furthermore, given that a preceding vehicle is frequently located at a position that changes relatively slightly in a region ahead of the subject vehicle for some duration of time during ordinary driving on a road, even if the margin is made small as described above, the light distribution of the subject vehicle does not change frequently. Hence, the driver of the subject vehicle does not experience a distraction.

On the other hand, in the case of an oncoming vehicle, swivel control is performed so that the vertical cut-off lines of the left high-beam light distribution pattern LM of the left head lamp LHL and the right high-beam light distribution pattern RM of the right head lamp RHL, constituting the split light distribution pattern SP, hold the margin mo having been set for the oncoming vehicle CAR as shown in FIG. 7A. Furthermore, in the case of a close oncoming vehicle, swivel control is performed so that the cut-off line of the left high-beam light distribution pattern LHi holds the margin mo having been set for the oncoming vehicle CAR as shown in FIG. 7B. Since the margin mo for the oncoming vehicle CAR has been set so as to be larger than the margin mf of the preceding vehicle, the light distribution becomes insensitive in response to the movement of the oncoming vehicle CAR in the left-right direction. FIG. 7C shows an example case in which the subject vehicle and multiple oncoming vehicles (CAR and CAR 2) pass each other sequentially. When the subject vehicle and the first oncoming vehicle CAR pass each other, the vertical cut-off line of the left high-beam light distribution pattern LHi follows the oncoming vehicle CAR with reduced sensitivity while the large margin mo is securely obtained for the oncoming vehicle CAR. In addition, swivel movement is not performed sufficiently rightward for the oncoming vehicle CAR as indicated by a broken line in the figure. When the subsequent oncoming vehicle CAR 2 is detected near the central position at the time, the left high-beam light distribution pattern LHi returns leftward to the central position as indicated by a solid line in the figure. The amount of the movement is small, and the pattern is moved quickly to a position appropriate for the subsequent oncoming vehicle CAR 2. In Particular, when the subsequent oncoming vehicle CAR 2 is detected inside the margin mo of the left high-beam light distribution pattern LHi being swivel-controlled for the foregoing oncoming vehicle CAR, the left high-beam light distribution pattern LHi is not moved by the swivel control. Hence, even when the subject vehicle and the multiple oncoming vehicles pass each other sequentially, glare to the drivers of the respective oncoming vehicles can be prevented. Furthermore, at that time, the left high-beam light distribution pattern LHi is not swivel-controlled or is rarely subjected to swivel control in a large range in the left-right direction. Hence, the movement of the light distribution pattern, that is, the distracting movement of the cut-off line of the left high-beam light distribution pattern, is suppressed, such that the driver of the subject vehicle is not distracted.

The light distribution controller according to the foregoing embodiment is configured so that light distribution changes depending on whether a vehicle ahead of the subject vehicle is a preceding vehicle or an oncoming vehicle, in which the head lamps are capable of providing split light distribution or one-side high-beam light distribution. However, the controller can also be configured as a head lamp light distribution controller that switches between high-beam light distribution and low-beam light distribution for a preceding vehicle and an oncoming vehicle. Furthermore, the above-mentioned embodiment includes an example in which the margin that the swivel-controlled light distribution follows the movement of a vehicle is made different depending on whether a vehicle ahead of the subject vehicle is a preceding vehicle or an oncoming vehicle. However, even in a light distribution controller configured so that just the swivel control is performed while the same light distribution is maintained for both a preceding vehicle and an oncoming vehicle, the controller may be configured so that the margin in the case of the preceding vehicle is made different from that in the case of the oncoming vehicle, such that the swivel control for the oncoming vehicle is made substantially insensitive. Accordingly, the distracting movement of the cut-off line when the subject vehicle and the oncoming vehicle pass each other can be suppressed, and a distraction to the driver of the subject vehicle can be prevented.

The embodiments of the present disclosure can be applied to an apparatus for performing the ADB control to control the light distribution of vehicle head lamps. Other implementations are within the scope of the claims.

What is claimed is:

1. A vehicle head lamp light distribution controller comprising:
   an ADB controller configured to:
      detect a position of a vehicle present ahead of a subject vehicle;
      determine whether the vehicle ahead of the subject vehicle is a preceding vehicle or an oncoming vehicle;
      set a threshold vehicle position based on whether the vehicle ahead of the subject vehicle is a preceding vehicle or an oncoming vehicle;
      compare the threshold vehicle position and the detected vehicle position; and
      switch light distribution of head lamps of the subject vehicle between a split light distribution pattern and a one-side high-beam light distribution pattern based on the comparison between the threshold vehicle position and the detected vehicle position.

2. The vehicle head lamp light distribution controller according to claim 1, wherein the ADB controller is further configured to adjust a light distribution switching margin based on whether the vehicle ahead of the subject vehicle is a preceding vehicle or an oncoming vehicle.

3. The vehicle head lamp light distribution controller according to claim 2, wherein the ADB controller is further configured to:
   set the light distribution switching margin to a first value when the vehicle ahead of the subject vehicle is an oncoming vehicle; and set the light distribution switching margin to a second value when the vehicle ahead of the subject vehicle is a preceding vehicle, wherein the first value is larger than the second value.

4. The vehicle head lamp light distribution controller according to claim 1, further comprising:
   a swivel controller configured to perform swivel control, wherein
   if the ADB controller switches the light distribution of the head lamps of the subject vehicle to the split light distribution pattern, the swivel controller performs the swivel control so that the vehicle ahead of the subject vehicle is in a substantially center of the split light distribution pattern.

5. The vehicle head lamp light distribution controller according to claim 1, further comprising:
   a swivel controller configured to perform swivel control, wherein
   if the ADB controller switches the light distribution of the head lamps of the subject vehicle to the split light distribution pattern, the swivel controller performs the swivel control so that a light shielding section of the split light distribution pattern follows the vehicle ahead of the subject vehicle.

6. The vehicle head lamp light distribution controller according to claim 1, further comprising:
   a swivel controller configured to perform swivel control, wherein
   if the ADB controller switches the light distribution of the head lamps of the subject vehicle to the one-side high-beam light distribution pattern, the swivel controller performs the swivel control so that at least a part of the vehicle ahead of the subject vehicle is in a light shielding section of the one-side high-beam light distribution pattern.

7. The vehicle head lamp light distribution controller according to claim 1, further comprising:
   a swivel controller configured to perform swivel control, wherein
   if the ADB controller switches the light distribution of the head lamps of the subject vehicle to the one-side high-beam light distribution pattern, the swivel controller performs the swivel control so as to prevent the one-side high-beam light distribution pattern from causing glare to the vehicle ahead of the subject vehicle.

8. The vehicle head lamp light distribution controller according to claim 1, further comprising:
   a swivel controller configured to perform swivel control so that the light distribution of the head lamps of the subject vehicle follow the vehicle ahead of the subject vehicle.

9. A vehicle head lamp light distribution controller comprising:
   an ADB controller configured to:
      detect a position of a vehicle present ahead of a subject vehicle;
      determine whether the vehicle ahead of the subject vehicle is a preceding vehicle or an oncoming vehicle;
      set a threshold vehicle position based on whether the vehicle ahead of the subject vehicle is a preceding vehicle or an oncoming vehicle;
      compare the threshold vehicle position and the detected vehicle position; and
      switch light distribution of head lamps of the subject vehicle among a split light distribution pattern, a one-side high-beam light distribution pattern, and a low beam pattern, based on the comparison between the threshold vehicle position and the detected vehicle position.

10. The vehicle head lamp light distribution controller according to claim 9, further comprising:

a swivel controller configured to perform swivel control, wherein if the ADB controller switches the light distribution of the head lamps of the subject vehicle to the split light distribution pattern, the swivel controller performs the swivel control so that the vehicle ahead of the subject vehicle is in a substantially center of the split light distribution pattern.

11. The vehicle head lamp light distribution controller according to claim 9, further comprising:

a swivel controller configured to perform swivel control, wherein if the ADB controller switches the light distribution of the head lamps of the subject vehicle to the split light distribution pattern, the swivel controller performs the swivel control so that a light shielding section of the split light distribution pattern follows the vehicle ahead of the subject vehicle.

12. The vehicle head lamp light distribution controller according to claim 9, further comprising:

a swivel controller configured to perform swivel control, wherein if the ADB controller switches the light distribution of the head lamps of the subject vehicle to the one-side high-beam light distribution pattern, the swivel controller performs the swivel control so that at least a part of the vehicle ahead of the subject vehicle is in a light shielding section of the one-side high-beam light distribution pattern.

13. The vehicle head lamp light distribution controller according to claim 9, further comprising:

a swivel controller configured to perform swivel control, wherein if the ADB controller switches the light distribution of the head lamps of the subject vehicle to the one-side high-beam light distribution pattern, the swivel controller performs the swivel control so as to prevent the one-side high-beam light distribution pattern from causing glare to the vehicle ahead of the subject vehicle.

14. The vehicle head lamp light distribution controller according to claim 9, further comprising:

a swivel controller configured to perform swivel control so that the light distribution of the head lamps of the subject vehicle follow the vehicle ahead of the subject vehicle.

15. A vehicle head lamp light distribution controller comprising:

an ADB controller configured to:

detect a position of a vehicle present ahead of a subject vehicle, determine whether the vehicle ahead of the subject vehicle is a preceding vehicle or an oncoming vehicle, set a threshold vehicle position based on whether the vehicle ahead of the subject vehicle is a preceding vehicle or an oncoming vehicle;

compare the threshold vehicle position and the detected vehicle position, and switch light distribution of head lamps of the subject vehicle based on the comparison between the threshold vehicle position and the detected vehicle position; and a swivel controller configured to perform swivel control so that the light distribution of the head lamps of the subject vehicle follow the vehicle ahead of the subject vehicle.

16. The vehicle head lamp light distribution controller according to claim 15, wherein if the ADB controller switches the light distribution of the head lamps of the subject vehicle to the split light distribution pattern, the swivel controller performs the swivel control so that the vehicle ahead of the subject vehicle is in a substantially center of the split light distribution pattern.

17. The vehicle head lamp light distribution controller according to claim 15, wherein if the ADB controller switches the light distribution of the head lamps of the subject vehicle to the split light distribution pattern, the swivel controller performs the swivel control so that a light shielding section of the split light distribution pattern follows the vehicle ahead of the subject vehicle.

18. The vehicle head lamp light distribution controller according to claim 15, wherein if the ADB controller switches the light distribution of the head lamps of the subject vehicle to the one-side high-beam light distribution pattern, the swivel controller performs the swivel control so that at least a part of the vehicle ahead of the subject vehicle is in a light shielding section of the one-side high-beam light distribution pattern.

19. The vehicle head lamp light distribution controller according to claim 15, wherein if the ADB controller switches the light distribution of the head lamps of the subject vehicle to the one-side high-beam light distribution pattern, the swivel controller performs the swivel control so as to prevent the one-side high-beam light distribution pattern from causing glare to the vehicle ahead of the subject vehicle.

20. The vehicle head lamp light distribution controller according to claim 15, wherein the ADB controller is further configured to adjust a light distribution switching margin based on whether the vehicle ahead of the subject vehicle is a preceding vehicle or an oncoming vehicle.

* * * * *